Figure 1:
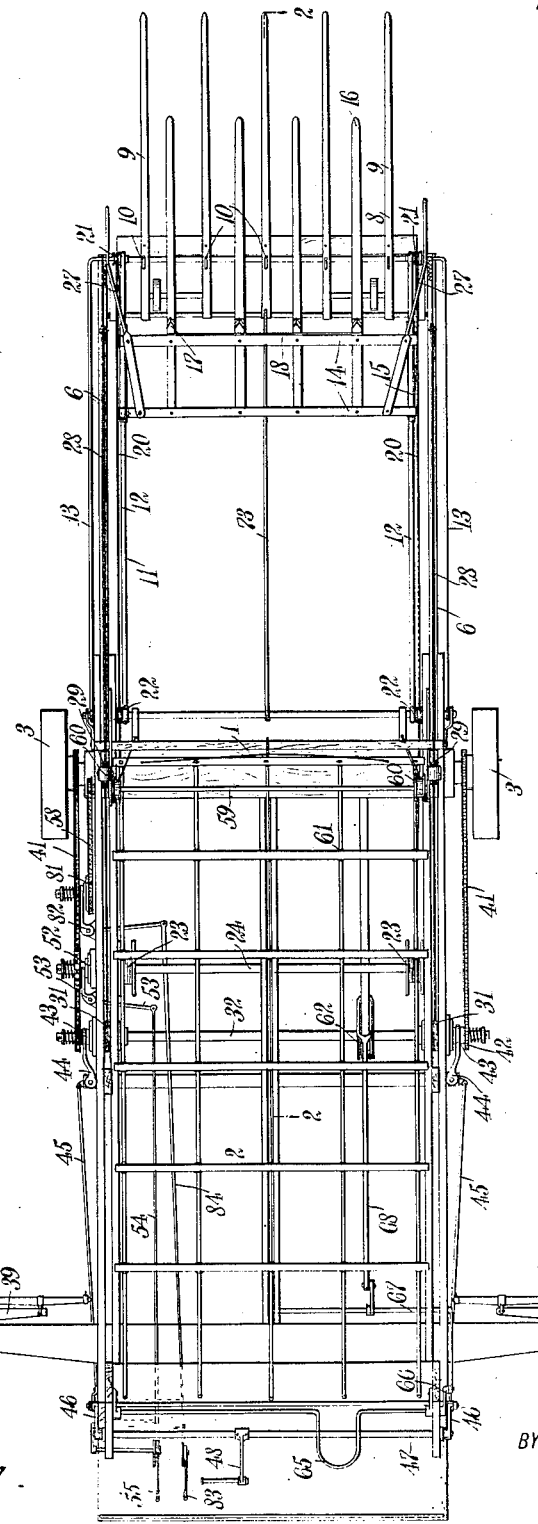

G. H. TARVIN.
SHOCK LOADER.
APPLICATION FILED AUG. 17, 1910.

1,008,217.

Patented Nov. 7, 1911.
4 SHEETS—SHEET 1.

WITNESSES:

INVENTOR
Guy H. Tarvin
BY
ATTORNEYS

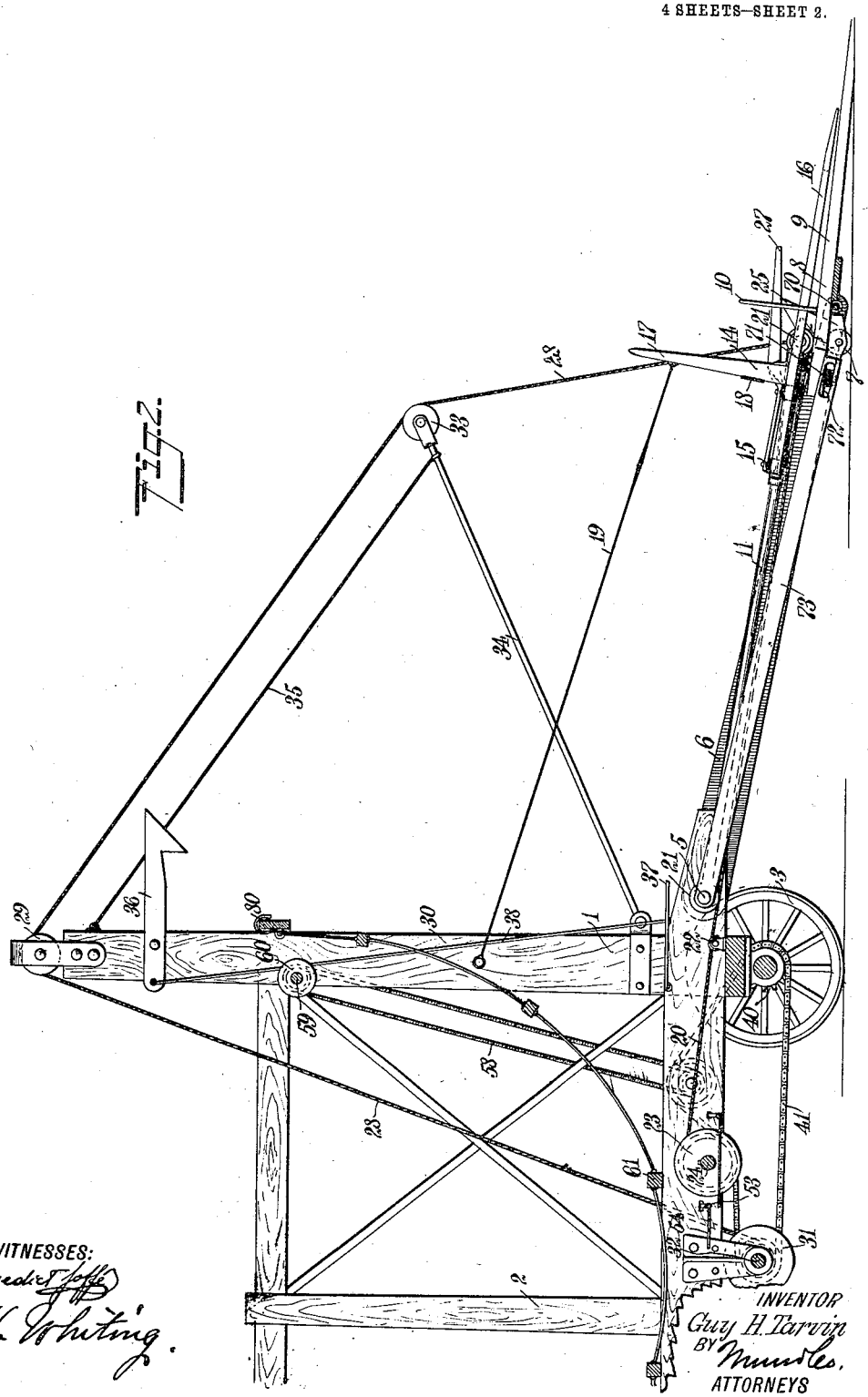

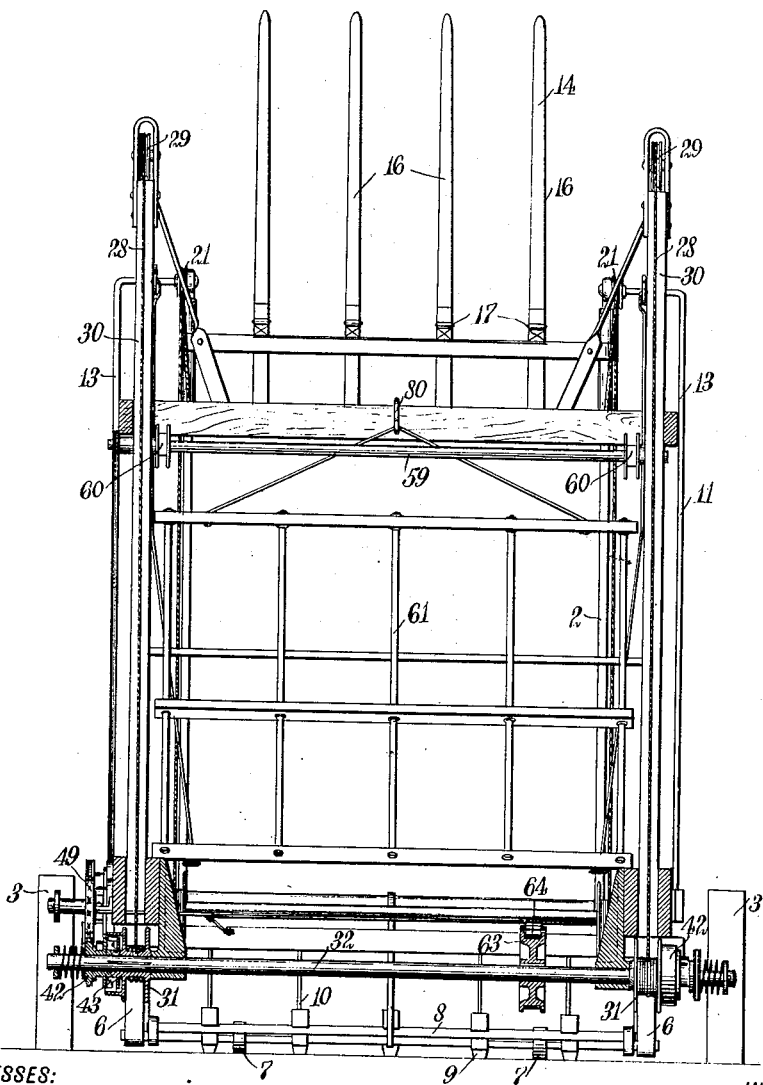

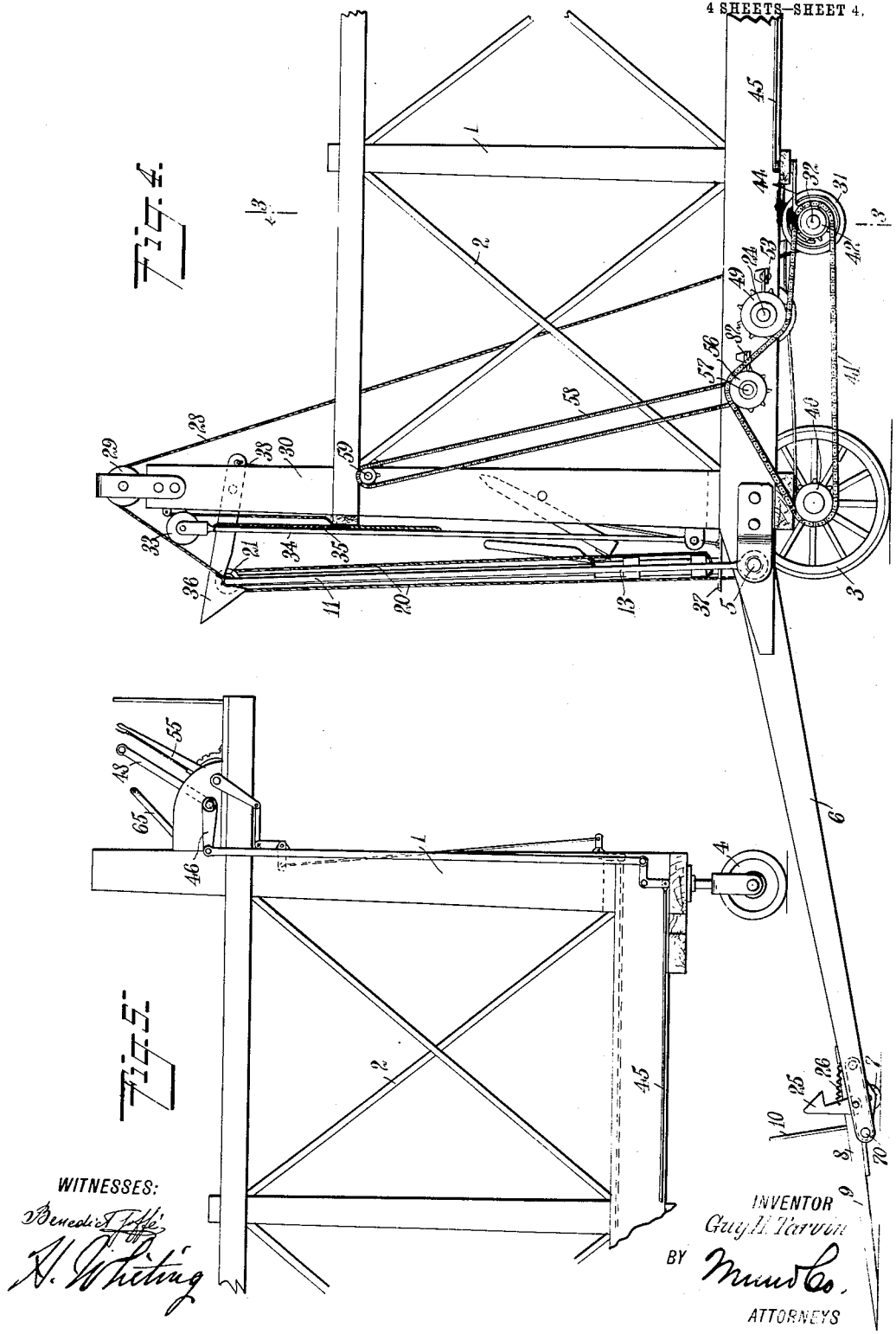

UNITED STATES PATENT OFFICE.

GUY H. TARVIN, OF SISSETON, SOUTH DAKOTA.

SHOCK-LOADER.

1,008,217.   Specification of Letters Patent.   Patented Nov. 7, 1911.

Application filed August 17, 1910. Serial No. 577,592.

*To all whom it may concern:*

Be it known that I, GUY H. TARVIN, a citizen of the United States, and a resident of Sisseton, in the county of Roberts and State of South Dakota, have invented a new and Improved Shock-Loader, of which the following is a full, clear, and exact description.

This invention relates to a new and improved loader adapted to run along the field and pick up a shock of hay or grain and deposit it in the wagon rack carried therewith.

An object of this invention is to provide a device with a fork adapted to scoop a bundle of grain or a pile of hay off the ground, and an auxiliary swinging fork adapted to remove the material from the first-mentioned fork and deposit it into a rack.

Another object of this invention is to provide means for automatically locking the swinging members of a swinging fork in their raised position, with means for automatically releasing said locking means.

A further object of this invention is to provide a device with a swinging fork having the fork proper movable relative to the swinging members, with a lock for securing the swinging members in their lowered position and adapted to be released by the fork proper.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 1 is a top plan view; Fig. 2 is a fragmentary longitudinal section on the line 2—2 of Fig. 1; Fig. 3 is a vertical transverse section on the line 3—3 of Fig. 4; Fig. 4 is a fragmentary side view in elevation, showing the front part of the loader; and Fig. 5 is a fragmentary view in side elevation, showing the rear part of the loader.

Referring more particularly to the separate parts of the device, 1 indicates a wagon, which may be of any suitable structure, such as comprising a body portion provided with a shock or hay rack 2 and supported on any suitable type of rollers, such as front wheels 3 and rear caster wheels 4, which permit the turning of the loader.

Extending to the front of the machine, and pivotally connected to the body of the wagon in any well known manner, as by being pivoted to a transverse shaft 5, there is provided a frame 6. This frame 6 is supported at its forward end in close juxtaposition to the ground. On the forward end of this frame 6, there is provided a pick-up fork 8, which is adapted to slide along in juxtaposition to the ground and pick up a bundle or shock of grain or a pile of hay. This fork 8 is pivotally connected intermediate its ends to the frame 6, as at 70, and is provided with a plurality of rollers 7, rotatably supported thereon and adapted to support the fork and the frame 6 in juxtaposition to the ground and still allow for the unevenness thereof. The pivotal motion of the fork 8 is limited by means of a bar 71 thereon, which engages in a slot 72 in a link 73 also pivotally connected to the shaft 5. This pick-up fork 8 may be of any suitable structure, such as comprising a plurality of lifting fingers 9, and a plurality of retaining or baby fingers 10 extending at an angle to the fingers 9. Also pivotally secured to the shaft 5, there is provided a swinger frame 11, which extends from the front part of the wagon 1 and comprises a plurality of guide bars 12 and auxiliary bars 13, the latter extending outside of the frame 6 and being connected at their forward ends to the bars 12. Slidingly mounted on the guide bars 12 of the swinger frame 11, there is provided a swinger fork 14, which may be of any suitable structure, such as comprising a carriage 15 slidingly mounted on the bars 12, supporting fingers 16 secured rigidly to the carriage 15, and retaining fingers 17 pivotally connected to the fingers 16 and preferably secured together by a transverse bar 18. These retaining fingers 17 may be provided with swing members for clamping between their surfaces and the surfaces of the fingers 16, the shock of grain or pile of hay deposited thereon.

It will be seen that, inasmuch as the swinger fork 14 is slidingly mounted on the swinger frame 11, it may assume a position at the extreme rear of the swinger frame when not in use, or at the extreme front of the swinger frame when it is desired to remove a shock of grain previously picked up by the pick-up fork 8. In order to open the swinger fork 14, that is to say, to raise the fingers 17 into the position occupied in Fig. 2, there is provided a flexible connection 19, which is secured to the wagon body 1 at one end and to the fingers 17 at the opposite end, and is of such a length that when the fork 14 assumes its outer and lowermost position, the connection 19 will be so short that it will hold the fingers 17 erect.

For the purpose of sliding the swinger fork 14 from its rearmost position to its foremost position, there are provided flexible connections 20, which pass over guide pulleys 21 on the forward part of the swinger frame 11, so as to change the direction of motion of the flexible connections, where they are attached to the fork 14 in any well known manner. The opposite ends of these flexible connections, after passing over suitable guide pulleys 22, are wound onto drums 23 on a shaft 24. This shaft may be driven intermittently in a manner to be described, so as to wind the flexible connections 20 onto the drums 23, so that the swinger fork 14 will be positively forced out into its foremost and lowermost position.

Normally the swinger frame 11 is locked in its lowered position by means of latches 25, which are held in engagement therewith by means of springs 26. When the swinger fork 14, however, is moved to its foremost position so that it can remove the material picked up by the pick-up fork 8, these latches 25 will have been released by oblique tripper guides 27, which come in engagement therewith during the forward motion of the swinger fork 14, so that the swinger frame 11 and the swinger fork carried thereby may be swung up into their raised position.

For the purpose of swinging the frame 11 and the fork 14 to their raised position when the latches 25 are released, there are provided flexible connections 28, which are secured adjacent the forward end of the frame 11 and pass over suitable guide pulleys 29 located on uprights 30 on the body of the wagon 1, from whence they pass downwardly and are wound on suitable drums 31 on a shaft 32, which are driven in a manner to be described.

For the purpose of directing the pull of the flexible connections 28 to a more advantageous angle when the swinger frame 11 is in its lowermost position, there are provided auxiliary guide pulleys 33 located on the extremities of brackets 34, which are pivotally connected to the wagon 1 so as to swing up when the frame 11 overtakes them during its upward swinging motion, and whose downward swinging motion is limited by means of flexible connections 35. When the frame 11 is raised to its uppermost position, so that the shock of grain or the bundle of hay taken by the fork 14 from the fork 8 can be deposited in the rack 2, it engages latches 36 on the uprights 30, which automatically lock it in its raised position. When the bundle of material has fallen from the fork 14 into the rack 2, the operator, by releasing the drums 23 in a manner to be described, can permit the fork 14 to slide down on the frame 11 by gravity. When this swinger fork 14 reaches the bottom of its travel, it strikes trippers 37, which are connected in any suitable manner to the latches 36 as by means of connecting rods 38, so that these latches are released by the arrival of the fork 14 at the bottom of its travel. When this takes place, the frame 11 can be lowered to its original position, illustrated in Fig. 2, by releasing the drums 31 and permitting them to unwind in a manner to be described.

While the loader may be driven over the ground by a mechanical motor, it is shown as being adapted to be pulled by a plurality of horses or mules attached to trees 39 disposed on opposite sides of the wagon, and secured thereto in any well known manner. This means of propulsion naturally imparts a rotary motion to the wheels 3, which have secured thereto sprockets 40, which engage driving chains 41. The latter engage corresponding sprockets 42 loosely mounted on the shaft 32.

Clutches 43 are provided on the shaft 32, whereby the sprockets 42 may be connected in driving relation with the drums 31, so as to drive the latter. For the purpose of manipulating these clutches, there are provided shifters 44, which are connected by means of link-and-lever connections 45, to bell crank levers 46 on a shaft 47. The latter is provided with a hand lever 48, whereby both of the clutches 43 may be operated simultaneously. The driving chains 41 also engage sprocket wheels 49 loosely mounted on the shaft 24. This shaft 24 may be connected in driving relation with the sprocket wheel 49 by means of a clutch 52, which is operated by a shifter 53, which in turn may be connected by means of link-and-lever connections 54 to an operating lever 55, located where the operator stands, adjacent the rear of the machine. The driving chain also engages a sprocket wheel 56 on a shaft 57, which drives, through a chain-and-sprocket connection 58, a shaft 59, on which are located pulleys 60. The chain and sprocket connection 58 is normally disconnected from driving relation with the shaft 57, and is adapted to be connected in driving relation therewith by means of a clutch 81, which is operated by a shifter 82, which in turn may be operated by a lever 83, connected thereto by means of a link 84.

The purpose of the pulleys 60 is to pull back into the rack 2 a sling 61 after the latter has been hauled therefrom, for the purpose of unloading the loader. For the purpose of controlling the lowering of the swinger frame 11, the shaft 32 is provided with a brake 62, comprising a brake wheel 63 secured to the shaft 32, and a band 64 adapted to engage the brake wheel. This band is adapted to be tightened on the wheel 63 by means of a crank shaft 65, located adjacent the other operating lever, and connected to the band 64 by means of an arm 66, a bell crank lever 67, and a link 68.

The operation of the device will be readily understood when taken in connection with the above description. The loader is drawn over the ground by suitable draft animals attached to the trees 39, and is directed so as to bring the pick-up fork 8 beneath a pile of hay or a shock of grain, so that the material is bodily picked up onto the fork 8. When this has been accomplished, the operator connects the drums 23 in driving relation with the wheels 3 by means of the lever 55, so that the swinger fork 14 is shifted on the frame 11 until the fingers thereon come beneath the material on the pick-up fork 8. During its outward motion, the swinger fork 14 releases the latches 25 by means of the trippers 27 thereon, which engage with the latches 25, so that the frame 11 and the fork 14 carried thereby may be swung up into their elevated position by connecting the drums 31 in driving relation with the wheels 3 through the agency of the clutches 43, which the operator controls through the handle lever 48. The material lifted up by the fork 14 will continue its motion when the fork stops at its highest point, and will drop into the sling 61 in the rack 2. The frame 11, however, is locked in its uppermost position by the latch 36. As soon as the material has left the fork 14, the operator, by releasing the clutches 52, can permit the carriage 15 and the fork 14 carried thereby, to drop by gravity down to a point adjacent the shaft 5, where the fork hits the trippers 37, and by the weight thereof, releases the latches 36, so that the operator can now, by releasing the clutches 43, permit the frame 11 to swing down into its original position. The lowering of this frame 11 can be controlled by means of the brake 62, so as to avoid any unnecessary jarring of the loader.

As soon as the frame 11 reaches its lowermost position, it will be automatically locked in this position by the spring latches 25, which engage therewith. The device is thus set for another operation, with the swinger fork 14 in its original position in close juxtaposition to the body 1, and with the frame 11 locked down in position, and the pick-up fork 8 ready to pick up a new load of material. The operator can then direct the motion of the machine toward the next shock or bundle and repeat the operation as before. This is carried on until the rack 2 is full, when the load can be carried to any suitable point and deposited by attaching a hook 80 on the sling 61 to a suitable fixed point, and driving the loader forward, when the load will be pulled out with the sling and deposited on the ground. The sling 61 can be drawn back into the wagon by being attached to a suitable flexible connection and the latter attached to the pulleys 60, which may be driven by operating clutch 81.

While I have shown one embodiment of my invention, I do not wish to be limited to the specific details thereof, but desire to be protected in various changes, modifications and alterations which may come within the scope of the appended claims.

Having thus described my invention, I claim as new and desire to secure by Letters Patent:

1. The combination with a vehicle adapted to be run over the ground, of a harvesting pick-up fork for picking up hay or the like from the ground, a second fork on said vehicle, for taking the material from said pick-up fork, and means for manipulating said second fork into coöperative relation with said pick-up fork.

2. The combination with a vehicle adapted to be run over the ground, of a harvesting pick-up fork for picking up hay or the like from the ground, a second fork on said vehicle, normally out of engagement with said pick-up fork, mechanism for bringing said second fork into engagement with said pick-up fork, and additional mechanism for moving said second fork.

3. The combination with a vehicle adapted to be run over the ground, of a harvesting pick-up fork for picking up hay or the like from the ground, a swinger fork adapted to pick material from said pick-up fork, and means for swinging said swinger fork.

4. The combination with a vehicle adapted to be run over the ground, of a harvesting pick-up fork for picking up hay or the like from the ground, a swinger frame connected with said vehicle, and a second fork on said swinger frame, adapted to take the material from said pick-up fork.

5. The combination with a harvesting vehicle adapted to be run over the ground, of a pick-up member secured to said vehicle and adapted to glean material from the ground, a second member secured to said vehicle and movable so as to remove the material from said first-mentioned member and load it onto said vehicle, said second member being in the form of a fork, and means for manipulating said second member into and out of coöperative relation with said first member.

6. The combination with a pick-up fork, of a swinger frame connected to said pick-up fork, a second fork slidingly mounted on said swinger frame, and means for manipulating said second fork into coöperative relation with said pick-up fork.

7. The combination with a wagon, of a frame on said wagon, a pick-up fork on said frame, a swinger frame on said wagon, a swinger fork on said swinger frame, and means for adjusting said swinger fork on said swinger frame.

8. The combination with a wagon, of a frame on said wagon, a pick-up fork on said frame, a swinger frame on said wagon, a swinger fork on said swinger frame, means of adjusting said swinger fork on said swinger frame, and hoisting mechanism for swinging said swinger fork.

9. The combination with a wagon, of a frame on said wagon, a fork pivotally connected to said frame, rollers on said fork adapted to engage the ground, and means for limiting the pivotal motion of said fork.

10. The combination with a support, of a swinging fork on said support, and a latch for locking said swinging fork in its lowermost position.

11. The combination with a support, of a swinging fork on said support, a latch for locking said swinging fork in its lowermost position, and a tripper on said swinging fork for releasing said latch.

12. The combination with a support, of a swinging frame on said support, a fork on said frame, means for manipulating said frame, and a latch for locking said frame in its uppermost position.

13. The combination with a support, of a swinging frame on said support, a fork mounted on said frame, means for swinging said fork and said frame, a latch for locking said frame in its lowermost position, and a latch for locking said frame in its uppermost position, said latches being adapted to be released by the movement of said fork.

14. The combination with a support, of a swinging frame on said support, a fork on said frame, means for manipulating said frame, a latch for locking said frame in its uppermost position, and a tripper for releasing said latch.

15. The combination with a support, of a frame pivotally connected to said support, a fork slidingly mounted on said frame, means for swinging said frame, a flexible connection secured to said fork, a drum for operating said flexible connection to move said fork on said frame, said fork comprising supporting fingers and retaining fingers movable relative to said supporting fingers, and a connection between said retaining fingers and said support, adapted to move said retaining fingers relative to said supporting fingers during the motion of said fork.

16. The combination with a support, of a frame on said support, a fork slidingly mounted on said frame, means for moving said fork, said fork comprising supporting fingers and retaining fingers movable relative to said supporting fingers, and a flexible connection between said retaining fingers and said support, adapted to adjust the relative position of said retaining fingers with respect to said supporting fingers.

17. The combination with a wagon, comprising a body portion having a rack therein, of a sling in said wagon adapted to be removed therefrom to unload the wagon, means for returning said sling to the wagon, and a swinging fork adapted to fill said sling.

18. The combination with a support, of a frame pivotally connected to said support, a pick-up fork pivotally connected to said frame, a swinging frame pivotally connected to said support, a second fork slidingly mounted on said swinging frame, means for manipulating said swinging frame, and means for manipulating said second fork.

19. The combination with a support, of a frame pivotally connected to said support, a pick-up fork pivotally connected to said frame, a swinging frame pivotally connected to said support, a second fork slidingly mounted on said swinging frame, means for manipulating said swinging frame, means for manipulating said second fork, and latches for locking said swinging frame in a plurality of adjusted positions, said latches being adapted to be released by the movement of said second fork.

20. The combination with a support, of a movable frame on said support, a fork mounted on said frame, means for manipulating said fork and said frame, a latch for locking said frame in its lowermost position, and a latch for locking said frame in its uppermost position, said latches being released by said fork.

21. The combination with a support, of a fork sliding in contact with the ground, for picking up material from the ground, a second fork on said support, intermittently movable into and out of coöperative relation with said first-mentioned fork, for picking-up material from said first-mentioned fork, and hoisting mechanism for manipulating said second-mentioned fork.

In testimony whereof I have signed my name to this specification in the presence of two subscribing witnesses.

GUY H. TARVIN.

Witnesses:
E. J. TURNER,
LEO J. LUKOMTSCH.